US007152167B2

(12) United States Patent
Kurts et al.

(10) Patent No.: US 7,152,167 B2
(45) Date of Patent: Dec. 19, 2006

(54) APPARATUS AND METHOD FOR DATA BUS POWER CONTROL

(75) Inventors: Tsvika Kurts, Haifa (IL); Doron Orenstien, Haifa (IL); Marcelo Yuffe, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 10/317,776

(22) Filed: Dec. 11, 2002

(65) Prior Publication Data

US 2004/0117670 A1   Jun. 17, 2004

(51) Int. Cl.
*G06F 1/26* (2006.01)
*G11C 5/14* (2006.01)

(52) U.S. Cl. .................. 713/300; 713/323; 365/227

(58) Field of Classification Search ................ 713/300, 713/310, 323, 400; 365/207, 194, 189, 227; 710/301
See application file for complete search history.

(56) References Cited

U.S. PATENT DOCUMENTS

| | | | |
|---|---|---|---|
| 4,862,348 A | | 8/1989 | Nakamura |
| 4,947,379 A | * | 8/1990 | Okuyama ................. 365/233.5 |
| 5,327,394 A | * | 7/1994 | Green et al. ............. 365/233.5 |
| 5,432,944 A | | 7/1995 | Nuckolls et al. |
| 5,737,746 A | * | 4/1998 | Hardin et al. ................ 711/118 |
| 5,819,027 A | * | 10/1998 | Budelman et al. ............. 714/47 |
| 5,848,428 A | | 12/1998 | Collins |
| 5,884,088 A | | 3/1999 | Kardach et al. |
| 5,915,121 A | | 6/1999 | Wagner |
| 6,058,059 A | * | 5/2000 | Huang et al. ................ 365/207 |
| 6,073,195 A | * | 6/2000 | Okada ........................ 710/301 |
| 6,076,140 A | | 6/2000 | Dhong et al. |
| 6,141,765 A | * | 10/2000 | Sherman ...................... 713/400 |
| 6,330,679 B1 | | 12/2001 | Conary et al. |
| 6,339,552 B1 | * | 1/2002 | Taruishi et al. ......... 365/189.05 |
| 6,643,792 B1 | * | 11/2003 | Kurosawa ..................... 713/501 |
| 2001/0037421 A1 | | 11/2001 | Singh et al. |
| 2003/0126485 A1 | | 7/2003 | Wilcox et al. |
| 2003/0131125 A1 | | 7/2003 | Ooi |
| 2004/0117670 A1 | | 6/2004 | Kurts et al. |

FOREIGN PATENT DOCUMENTS

EP   0 932 097 A1   7/1999
WO   WO 03/058467 A1   7/2003

OTHER PUBLICATIONS

Snyder, Jeffrey, "New Pentium M Brings Integrated Graphics, I/O to Low-Power Embedded Apps", COTS Journal, May 2004, <http://www.cotsjournalonline.com/home/printthis.,php?id=100119>, <http://www.cotsjournalonline.com/home/article., php?id=100119>.

(Continued)

*Primary Examiner*—Thomas Lee
*Assistant Examiner*—Suresh K Suryawanshi
(74) *Attorney, Agent, or Firm*—Blakely, Sokoloff, Taylor & Zafman LLP

(57) ABSTRACT

An approach for data bus power control. Data input sense amplifiers of a request agent are enabled prior to a data phase of a transaction according to a data bus power control signal. Once enabled, the data input sense amplifiers can capture data provided during the data phase of the read transaction. Accordingly, the data input sense amplifiers of the request agent are disabled according to the power control signal once the data phase of the read transaction is complete.

55 Claims, 14 Drawing Sheets

OTHER PUBLICATIONS

"Pentium Pro", Wikipedia, the free encyclopedia, Aug. 16, 2005, Retrieved from Internet 092605, <http://en.wikipedia.org/wiki/Pentium_Pro>.

Gochman et al, "The Intel Pentium M Processor: Microarchitecture and Performance", Intel Tech. Journal, vol. 7, Issue 2, May 21, 2003, ISSN 1535-864X.

"Multiprocessing", The Microsoft Press Computer Dictionary, Second Edition, 1994, Microsoft Press, ISBN 1-55615-597-2.

"Pentium M", Wikipedia, the free encyclopedia, Sep. 23, 2005, Retrieved from Internet 092605, <http://en.wikipedia.org/wiki/Pentium_M>.

* cited by examiner

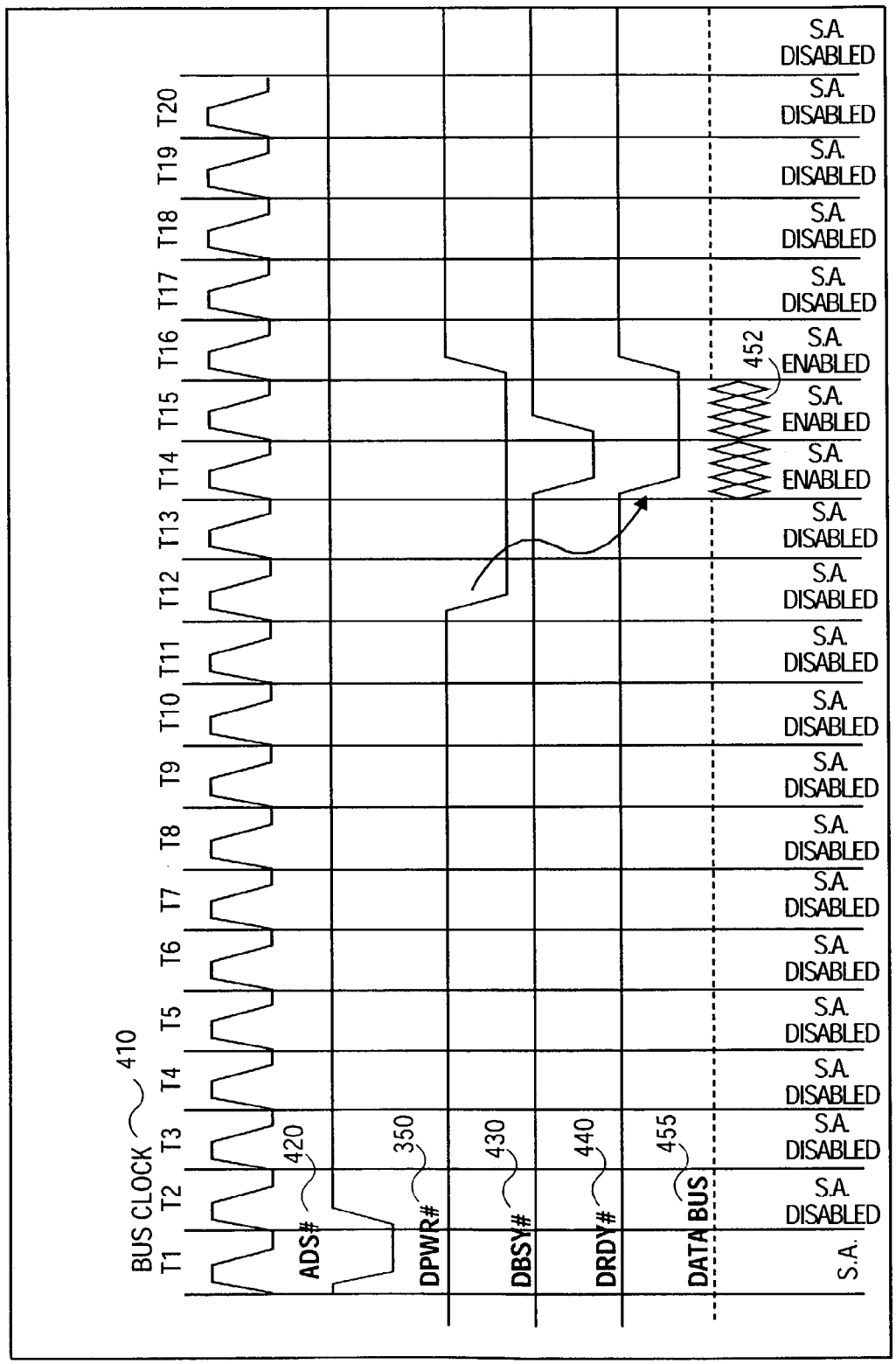

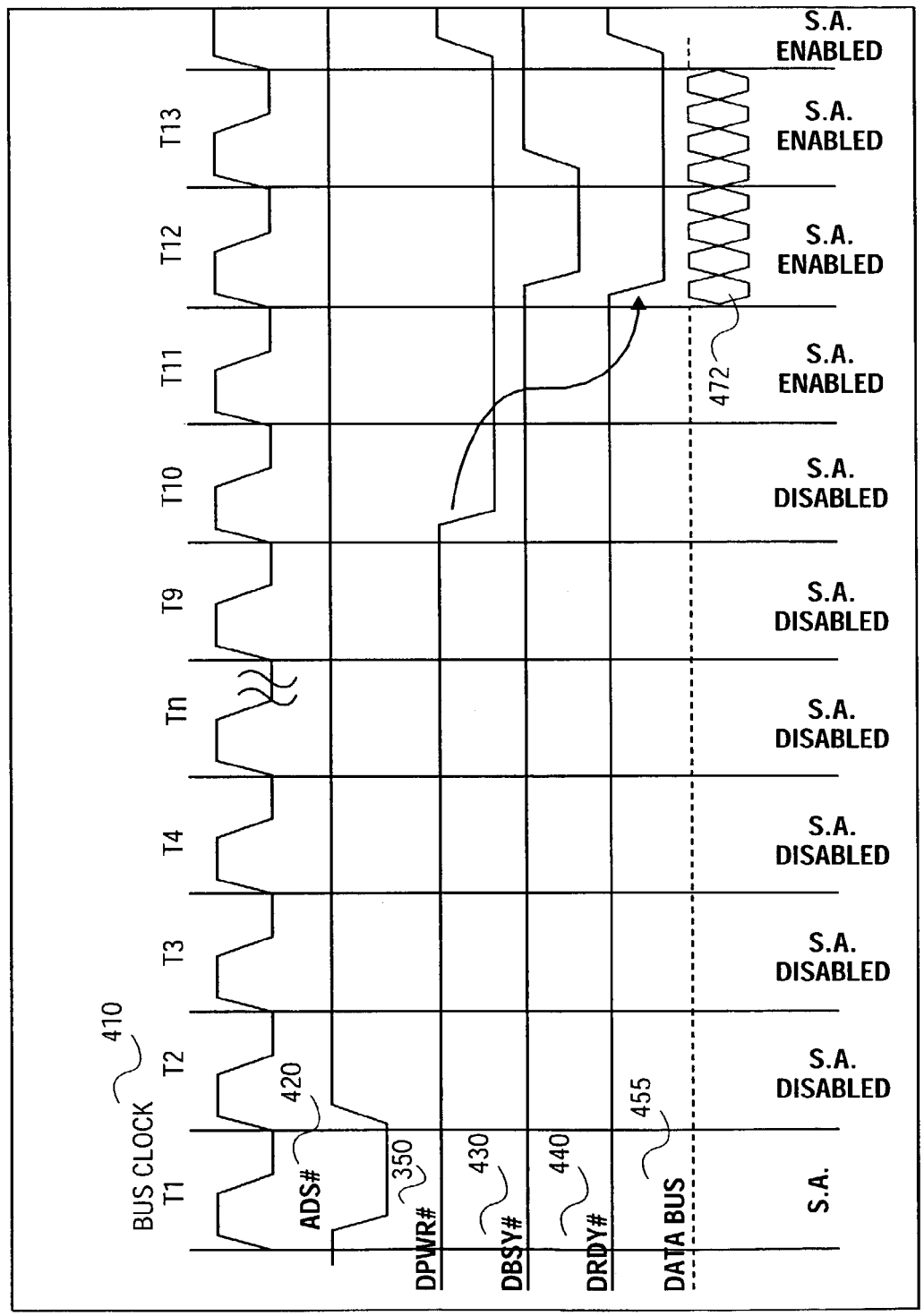

APPARATUS AND METHOD FOR DATA BUS POWER CONTROL

CROSS-REFERENCED APPLICATIONS

The present application is related to co-pending application entitled "An Apparatus and Method For Address Bus Power Control", filed on Dec. 11, 2002, and assigned application Ser. No. 10/317,798.

FIELD OF THE INVENTION

One or more embodiments of the invention relate generally to the field of integrated circuit and computer system design. More particularly, one or more of the embodiments of the invention relates to a method and apparatus for data bus power control.

BACKGROUND OF THE INVENTION

Communications between devices within a computer system are typically performed using one or more buses that interconnect such devices. These buses may be dedicated buses coupling two devices or non-dedicated buses that are multiplexed by a number of units and devices (e.g., bus agents). Moreover, buses within a computer system may be dedicated to transferring a specific type of information. For example, the x86 microprocessor architecture developed by Intel Corporation of Santa Clara, Calif., includes a three bus system with address, data and control buses for respectively transferring address, data and control signals.

In computer systems employing advanced architectures and processors, such as Pentium®Pro, Pentium®II, Pentium®III or Pentium®4 processors, bus transactions typically occur in a pipelined manner. Specifically, the next memory access may start after a previous transaction request is issued; and all components or phases of a bus transaction are not required to complete before another bus transaction may be initiated. Accordingly, requests from numerous bus agents may be pending at any one time. The pipelining of bus transactions is facilitated by separate data and address buses. When an address of a request is being sent on an address bus, data (or signals) corresponding to an address previously issued on the address bus may be returned on the data bus.

A vast amount of research and system architecture design efforts have been directed to increasing data throughput within computer systems. Technologies such as data pipelining, out-of-order execution, and the like, enable advanced architectures and processing with significantly higher clock rates and world-class performance.

Furthermore, this research, as well as architecture redesign, has enabled a mobile market for laptop computers, hand held devices, personal digital assistants (PDAs), and the like. Unfortunately, such mobile platforms may be limited to a run time dictated by the life of a battery used by the respective mobile platforms when another power source is not available. Depending on the complexity of the mobile platform, power resources from an attached battery may be depleted within a relatively short amount of time. In part, this is due to the fact that many electronic elements of the platform continue to consume power even when they are not being used.

BRIEF DESCRIPTION OF THE DRAWINGS

The various embodiments of the present invention are illustrated by way of example, and not by way of limitation, in the figures of the accompanying drawings and in which:

FIGS. 5A–5F illustrate timing diagrams in accordance with different embodiments.

DETAILED DESCRIPTION

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

A method and apparatus for data bus power control are described. In one embodiment, the method includes enabling, according to a power control signal, data bus input sense amplifiers of a processor prior to a data phase of a transaction. Once enabled, the data bus input sense amplifiers can capture data provided during the data phase. The data bus input sense amplifiers of the processor are then disabled according to the power control signal after the data phase has been completed if there are no further data phases within a predetermined range. As a result, power consumption due to the data bus input sense amplifiers may be reduced or avoided during periods of data bus inactivity.

Figure 1:
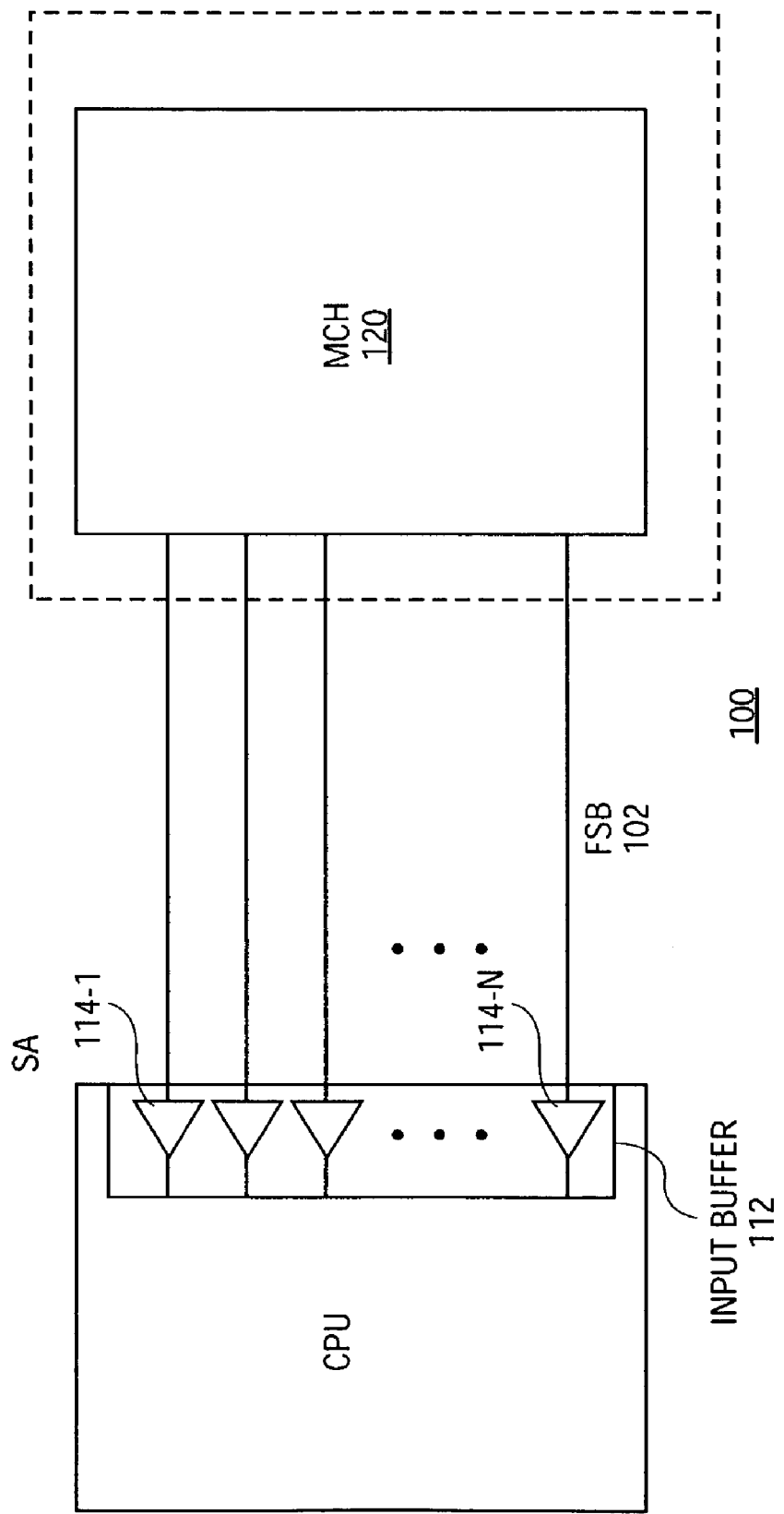
FIG. 1 is a block diagram illustrating a prior processor and memory control hub.

FIG. 1 is a diagram illustrating a prior processor (CPU) 110 and memory controller (MCH) arrangement for an exemplary computer system. As illustrated, CPU 110 may include input buffers 112 that operate to capture data received via data lines of a processor system bus or front-side bus (FSB) 102. The input buffers 112 of CPU 110 include a plurality of data bus input sense amplifiers 114 (114-1, . . . , 114-N) that may be coupled to sense data transmitted to the CPU 110 via a data bus portion of the FSB 102.

For the CPU 110, the data bus input sense amplifiers 114 are continuously enabled following system initialization. While enabled, the data input sense amplifiers 114 consume power, which in the case of a mobile platform could increase the drain on a battery. In addition, the sense amplifiers can increase an ambient temperature when continuously enabled.

Figure 2:
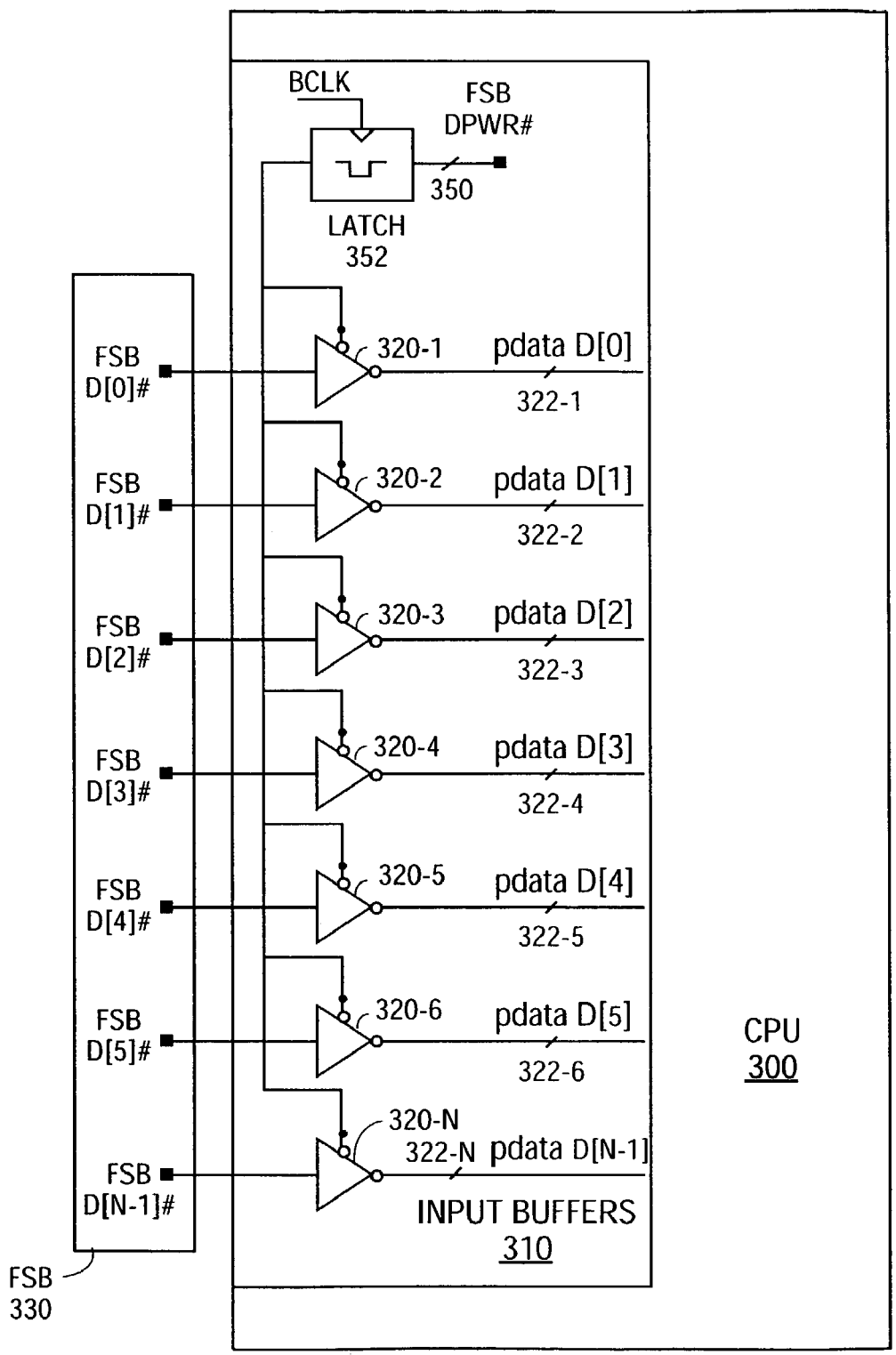
FIG. 2 is a block diagram illustrating a processor having an input buffer in accordance with one embodiment.

Referring now to FIG. 2, a processor (CPU) of one embodiment is described. For the embodiment shown in FIG. 2, the CPU 300 is a mobile platform CPU. It will be appreciated that, for other embodiments, the CPU 300 may be a different type of processor including, for example, a digital signal processor, a graphics processor, an embedded processor, etc.

As illustrated, CPU 300 includes input buffers that are shown collectively as input buffer 310. The input buffer 310 includes N data input sense amplifiers 320 (320-1, . . . , 320-N). The sense amplifiers 320 have outputs coupled to internal data bus signal lines (pdata) 322 (322-1, . . . , 322-N-1). Input buffer 310 may also be coupled to additional internal data and/or control lines. For one embodiment, the sense amplifiers 320 have inputs coupled to a plurality of data lines FSB D[0 . . . M] of a front-side bus (FSB) 330.

For one embodiment, the FSB 330 is compatible with the Pentium®4 processor front-side bus protocol, aspects of which are described in copending Singh et al., U.S. patent application Ser. No. 2001/0,037,421 A1 published Nov. 1, 2001. Where the FSB is compatible with the Pentium 4 processor front-side bus, the FSB 330 includes 64 data lines FSB D[0 . . . 63]. For other embodiments, it will be appreciated that the FSB 330 may be compatible with a different bus protocol and/or may include a different number of data lines.

With continuing reference to FIG. 2, for one embodiment, the input buffer 310 further includes a latch 352 that is coupled to receive a bus clock (BCLK) signal and a data bus power control (DPWR#) signal 350 associated with FSB 330. For one embodiment, the DPWR# signal may be received from, for example, a chipset device (not shown) that is further coupled to CPU 300 over the FSB 330. An output of the latch 352 is coupled to enable inputs of each of the data input sense amplifiers 320.

In operation, as the BCLK signal transitions, the latch 352 latches the state of the DPWR# signal. In response to the DPWR# signal being asserted, the data input sense amplifiers 320 of input buffer 310 are enabled to capture requested data from FSB 330 via data lines FSB D[0 . . . N]. Conversely, in response to the DPWR# signal being deasserted, the input data sense amplifiers are disabled. When the input sense amplifiers are disabled, their power dissipation, primarily thermal dissipation power (TDP) due to a bias current provided by the input buffer, is reduced.

Figure 3:
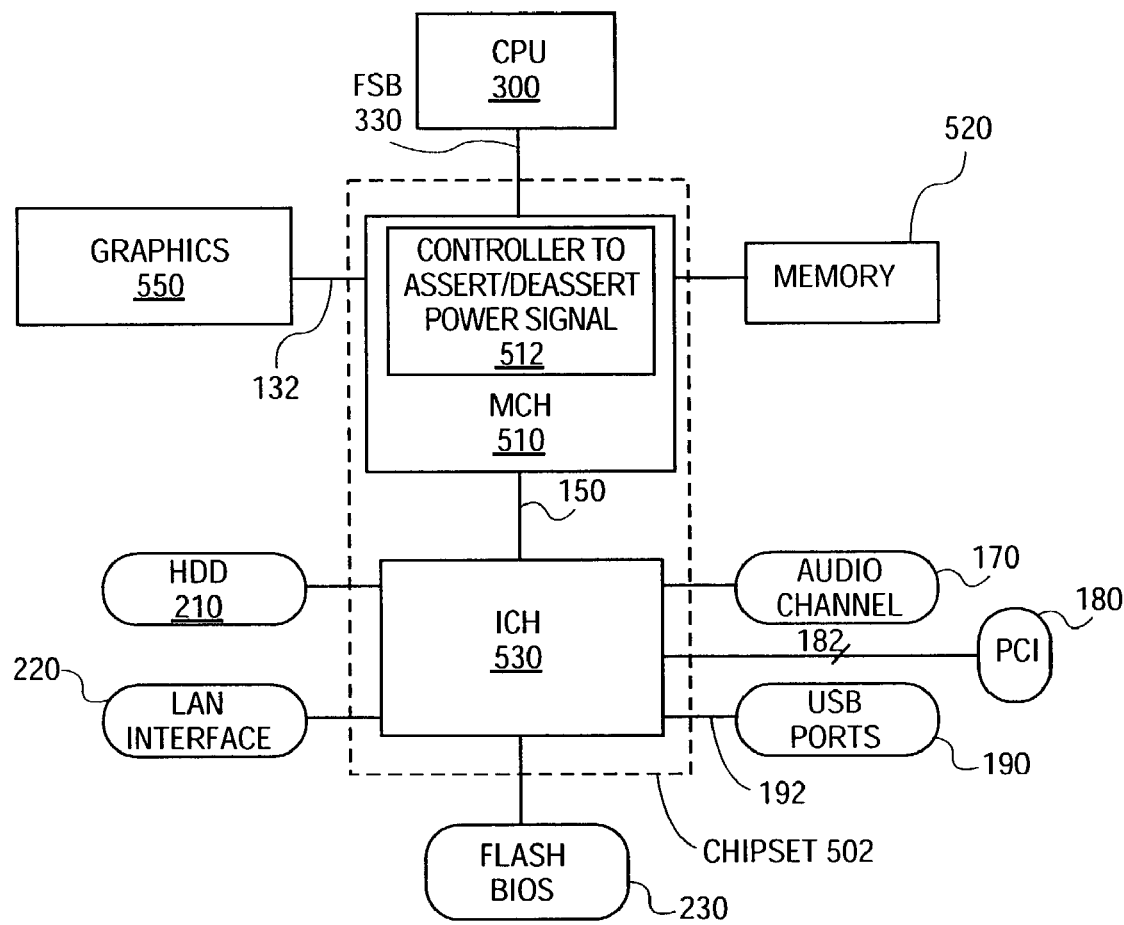
FIG. 3 is a block diagram illustrating a system platform in accordance with one embodiment.

FIG. 3 is a block diagram of an exemplary system 500 of one embodiment in which the CPU 300 of FIG. 2 may be advantageously used. In addition to the CPU 300, the system 500 includes a memory controller, referred to in one embodiment, as a memory control hub (MCH) 510, and an input/output (I/O) controller, referred to in one embodiment, as an I/O control hub (ICH) 530. Together, the MCH 510 and ICH 530 may be referred to as a chipset 502. The MCH 510 is coupled to the CPU 300 via the FSB 330 and to the ICH 530 via bus 150. Also coupled to the MCH 510 is main memory 520 and one or more graphics devices 550. In one embodiment, the graphics devices may be integrated on the MCH.

An I/O subsystem of the system 500 may include a variety of different types of input and/or output devices coupled to the ICH 530, such as a hard disk drive (HDD) 210, one or more USB ports 190 may be coupled to ICH 530 via a universal serial bus (USB) 192, and/or one or more peripheral component interconnect (PCI)-devices 180 may be coupled to the ICH via a corresponding bus 182. Additionally, for some embodiments one or more audio channels 170 and/or a local area network (LAN) interface 220 may also be coupled to ICH 530.

In one embodiment, the FSB 330 is compatible with the Pentium® 4 processor front-side bus, and is a pipelined data bus that includes address, data and control portions, which may alternately be referred to herein as address, data and control buses.

Devices coupled to the FSB 330 are also referred to herein as bus agents in reference to the FSB 330. For one embodiment, three types of agents may reside on FSB 330: request agents, response agents, and snoop agents. A request agent is a device that initiates a transaction by issuing a request such as, for example, a memory or I/O read or write request. A response agent is the target of the transaction such as, for example, an I/O target or a memory target. Snoop agents are devices on the bus typically associated with cache memories. For other embodiments, bus agents may be classified in a different manner.

Where the FSB 330 is a pipelined bus, bus transactions may be separated into phases and multiple transactions may overlap. Specifically, all components or phases of a bus transaction are not required to be completed before another bus transaction may be initiated.

As used herein, the term "transaction" designates a bus activity that is related to a single bus access request. A transaction may include several phases, each phase being associated with a specific set of bus signals to communicate a particular type of information. For one embodiment, exemplary phases may include, for example, an arbitration phase, a request phase, a snoop phase, a response phase and/or a data phase.

In the request phase, the requesting agent drives request control and address information on the FSB 330. During a subsequent snoop phase, it is determined, whether sought after data is stored locally and/or whether the transaction is likely to be completed in order with respect to previously issued transactions. In a response phase, a response agent reports to the requesting agent information indicating whether the requested transaction has succeeded or failed. If the requested transaction includes data transfer, a data phase, also referred to as a data transfer phase, may be initiated in response to the assertion of a data ready (DRDY#) signal.

As shown in FIG. 3, in one embodiment, the DPWR# signal discussed above is to be asserted and deasserted by the MCH 510 as part of the FSB 330. In one embodiment, the MCH includes a controller 512 (also referred to herein as a bus interface) to cause assertion and deassertion of the DPWR# signal. In alternative embodiments, the controller 512 may be provided on other devices/agents coupled to the FSB 330. The manner in which the controller 512 is to cause assertion and deassertion of the DPWR# signal is discussed in more detail below.

Figure 4:
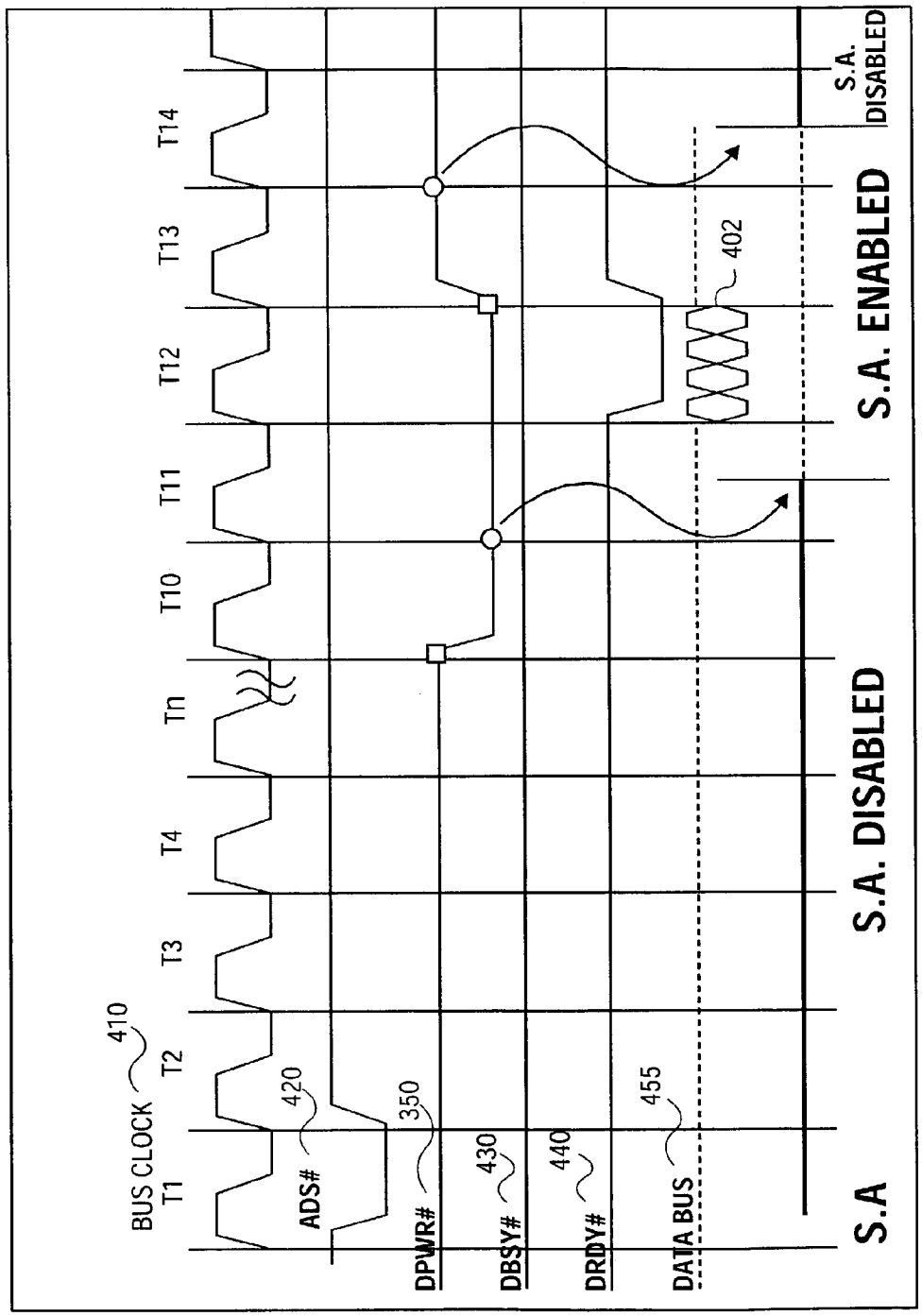
FIG. 4 illustrates a timing diagram in accordance with one embodiment.

In one embodiment, the controller 512 is to cause assertion and deassertion of the DPWR# signal such that the input data sense amplifiers 320 of the CPU 300 are disabled during times that there is no data activity on the FSB 330 and enabled prior to data transfer operations. For one embodiment, the controller is to determine, based on a transaction request type, the expected data access time to acquire requested data. Based on the expected access time, the controller 512 is to cause assertion of the DPWR# signal such that the sense amplifiers 320 of the CPU 300 are enabled in time to sense the data to be provided. Once the data phase has been completed, if there are no upcoming data phases within a predetermined timeframe (e.g. a given number of clock periods), the controller 512 is to cause deassertion of the DPWR# signal to reduce power consumption of the sense amplifiers FIG. 4 is a timing diagram illustrating the DPWR# signal for one embodiment. The timing diagram shows clock periods T1–T14 of a bus clock (BCLK) signal 410 that may be used to provide the BCLK signal, an address strobe signal (ADS#) 420, the DPWR# signal 350, a data busy (DBSY#) signal 430, a data ready (DRDY#) signal 440, each of which are part of the FSB 330, and a signal 455 indicative of data activity on the data bus portion of the FSB 330. In embodiments where the FSB 330 is compatible with the Pentium 4 processor front-side bus protocol, the above signals, other than the DPWR# signal, are defined and operate in accordance with corresponding Pentium 4 processor front-side bus signals.

For the above signals, a "#" at the end of the signal name indicates that the associated signal is an active low signal (i.e. considered to be asserted when it is at a logic low level). It will be appreciated that active high signals may be used instead with corresponding changes in associated circuitry to provide similar functionality. Further, for one embodiment, one or more of the FSB 330 signals are low voltage swing signals that have a voltage swing smaller than full swing.

In the example transaction illustrated in FIG. 4, a request agent such as the CPU 300 initiates a read transaction request by asserting the ADS# signal in T1. A response agent such as the MCH 510, and in one embodiment the controller 512 of the MCH, samples associated address information and detects the type of read transaction requested. Based on the type of read transaction requested, the controller 512 determines an expected data access time associated with the request to determine a data delivery clock period.

The controller 512 is then to assert the DPWR# signal a predetermined number of clock periods prior to the identified data delivery clock period to provide enough time for the sense amplifiers of the requesting agent (CPU 300) to be enabled before data arrives on the data bus. Generally, the identified data clock period is a function of the processing time consumed by the response agent device in performing the transaction. For example, if the response agent device (e.g., the MCH 510) recognize that a "read" transaction consumes 12 clock cycles; then, the controller 512 is to cause assertion of the DPWR# signal prior to the expiration of 12 cycles after a request for a "read" transaction (so that the request agent's sense amplifiers are activated in time to receive the requested data).

Figure 5B:
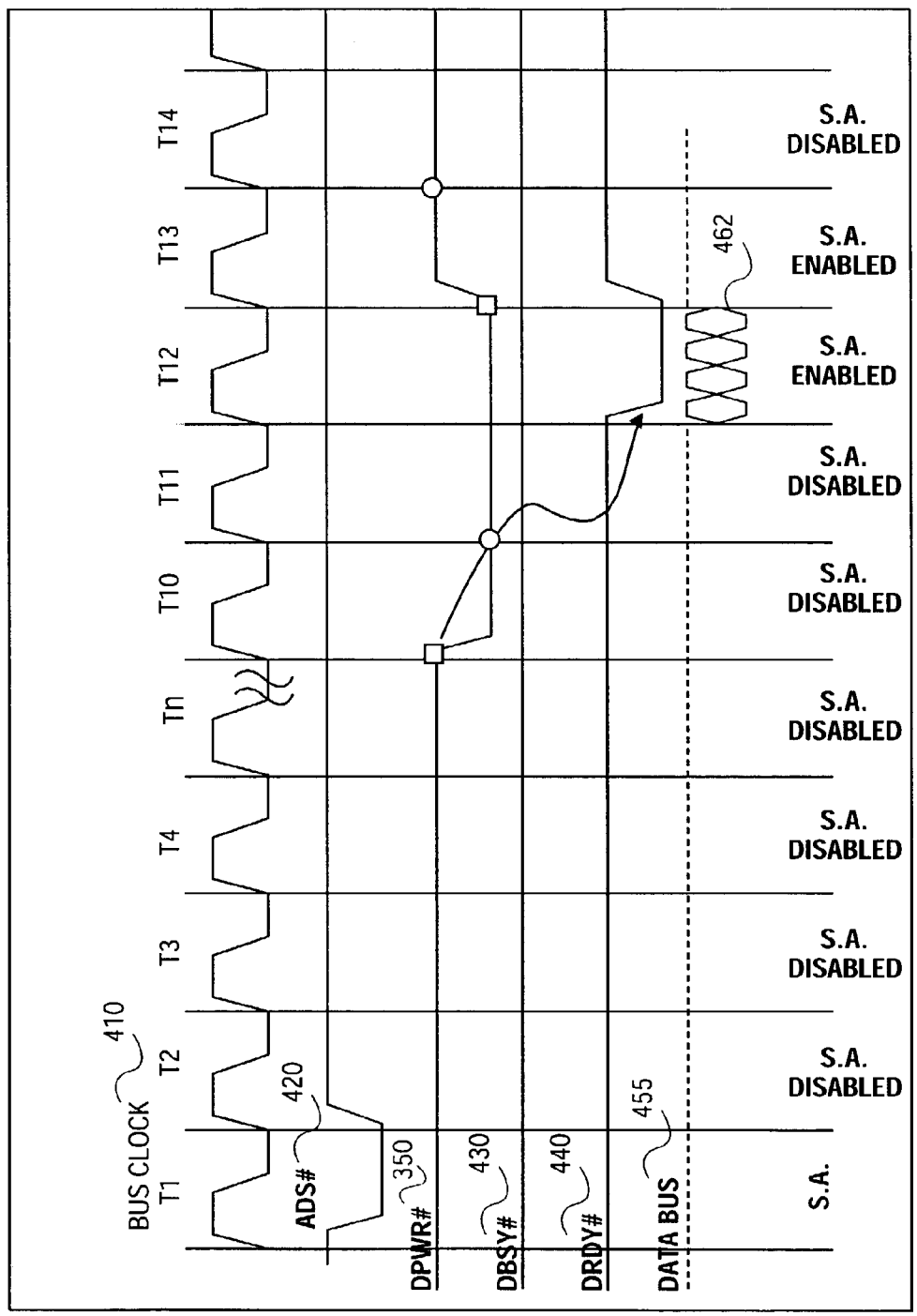

Note that a response agent may exhibit different response times for different transactions (e.g., 14 clock cycles for a "page miss transaction" vs. 12 clock cycles for a "partial read" transaction in page empty case as illustrated in more detail below with respect to FIGS. 5A and 5B, respectively). As a consequence, through characterization of the response agent's response times for various transactions, the controller 512 is to cause assertion of the DPWR# signal accordingly for each type of transaction that is to be supported. Note that as a request agent may be implemented with various types of underlying technologies (e.g., different semiconductor manufacturing processes), likewise, the amount of time consumed for a transaction may vary from embodiment to embodiment. As such, the particular clock cycle times at which the DPWR# signal is asserted in the examples that follow with respect to FIGS. 4 and 5A through 5F are to be understood as being selected from many different possible embodiments.

For the example shown in FIG. 4, it is assumed for purposes of illustration that the controller 512 determines the data delivery clock period to be T12. Further, for the exemplary embodiment shown, it is assumed that the predetermined number of clock periods is two such that the controller is to assert the DPWR# signal in T10 as shown. It will be appreciated that, for other embodiments, a different number of clock periods or another measure of time may be used to separate assertion of the DPWR# signal from the expected availability of the requested data.

Further, for some embodiments, the response agent may assert the DPWR# signal more than the predetermined number of clock periods prior to the data transfer, but not less than the predetermined number of clock periods prior to the actual data transfer in order to further ensure that the data sense amplifiers are ready when the data arrives. For such embodiments, the response agent may delay the data transfer in order to ensure that the predetermined separation between DPWR# signal assertion and data being returned and ready on the data bus is maintained.

The CPU 300 samples the DPWR# signal at the rising edge of the bus clock signal at T11 and provides the DPWR# signal to the sense amplifiers 320 such that they are enabled at clock period T12. The DRDY# signal is asserted by the response agent at T12 and the requested data is captured by the CPU 300.

Once the data has been transferred, the response agent (MCH 510 in this example) causes the DRDY# signal to be deasserted. The controller 512 may also cause the deassertion of the DPWR# signal in parallel for some embodiments. For other embodiments, the DPWR# signal may remain asserted if additional data phases directed to the CPU 300 are expected within a given timeframe as discussed in more detail below.

The CPU 330 detects the deassertion of the DPWR# signal at clock period T14, which causes the sense amplifiers 320 to be enabled shortly thereafter. In this manner, for the exemplary transaction described in reference to FIG. 4, the sense amplifiers are activated (i.e. enabled) for approximately two clock periods out of the thirteen clock periods for the overall transaction resulting in power savings as compared to prior approaches.

To further illustrate the operation of some embodiments, FIG. 5A is a timing diagram illustrating operation of the DPWR # and data input sense amplifiers 320 during a page miss, in accordance with one embodiment. As illustrated above, the response agent detects a read transaction by sampling transaction address information following assertion of the ADS# signal at bus clock T1. In the embodiment depicted, a page miss of the requested data causes the response agent to return the requested data 14 clock periods later (T14). Consequently, the data input buffer sense amplifiers 320 remain disabled until they are enabled during clock period T14. As such, the controller 512 may calculate the data phase clock period as T14.

Continuing with the above example for which the predetermined number of clock periods separating the assertion of the DPWR# signal and the arrival of requested data is two, the controller 512 is to cause assertion of the DPWR# signal 350 at bus clock period T12. The request agent samples the DPWR# signal on the rising edge of bus clock T13 and reacts by enabling the sense amplifiers in bus clock period T14. At bus clock T16 the response agent deasserts the DRDY# signal 440 and the controller 512 is to cause deassertion of the DPWR# signal 350 to indicate data phase completion in bus clock T16. Accordingly, as illustrated in FIG. 5A, the power savings provided in accordance with the enabling and/or disabling of the data input buffer sense amplifiers is approximately 12 clock periods for this particular example.

In one embodiment, the DPWR# signal may remain asserted to enable the sense amplifiers 320 during the data phase completion clock period T16 to enable a source synchronization strobe method that allows capturing of data at a next clock following deassertion of the DRDY# signal.

FIG. 5B is a timing diagram illustrating a partial read operation, in accordance with one embodiment. As illustrated, the ADS# signal 420 is asserted at bus clock T1 resulting in a data phase in bus clock T12. Assuming the same two clock window discussed in the above examples, the data input sense amplifiers 320 of input buffer 310 are enabled at bus clock T12 and disabled at bus clock T14 in response to the DPWR# signal being asserted at clock period T10 and deasserted at clock period T13 as shown. For this example, the data sense amplifiers 320 are enabled for approximately two clock periods of the thirteen total for the transaction such that a power savings may be realized for the input buffers as compared to prior approaches.

FIG. 5C is a timing diagram illustrating an example operation a cache line burst read, in accordance with one embodiment. As illustrated, the controller 512 is to cause assertion of the DPWR# signal 350 in bus clock period T10, which is sampled by the CPU 300 in bus clock period T11, such that, due to propagation delay, the data input sense amplifiers 320 are enabled in bus clock period T12. For this example, the response agent asserts the DBSY# signal 430 to indicate that the data bus 330 is occupied by the response agent for the next clock period (T13) as well. Accordingly, the data input sense amplifiers capture data 472 during clock periods T12 and T13 with DRDY# being asserted for the same time period. The DPWR# signal is deasserted in clock period T14 (substantially aligned with the deassertion of DRDY#) and the sense amplifiers 320 are disabled during clock period T15 (not shown).

Figure 5D:
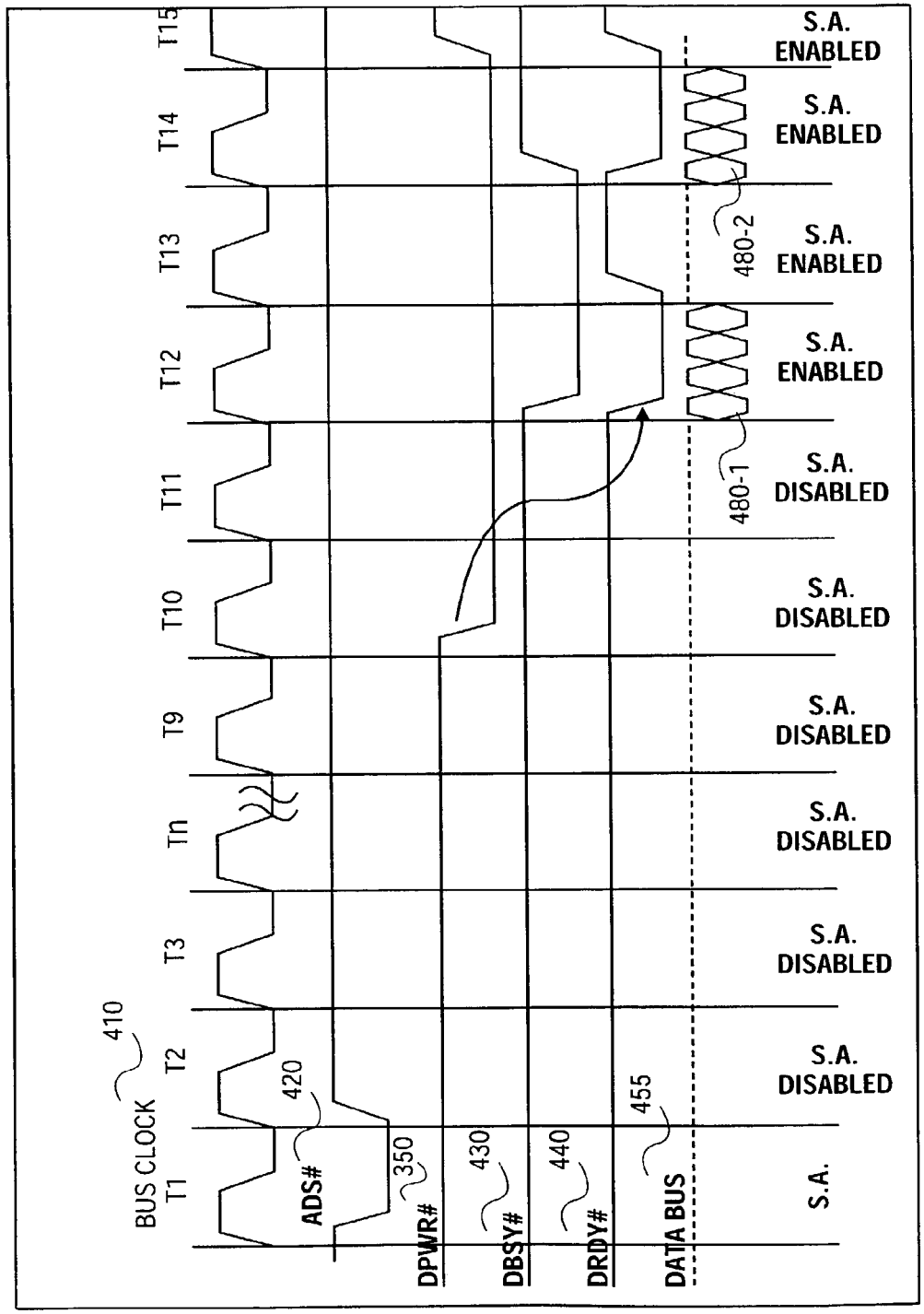

FIG. 5D is a timing diagram illustrating the a burst read transaction during which the DRDY# signal 440 is inactivated, in accordance with one embodiment. In one embodiment, the system 500 may be configured, for example, as a single channel DDR platform with 64 bit data bus width (excluding control and source synchronous signals). For this example, the DDR transfer rate may be, for example, 16 bits per bus clock period while the FSB transfer rate may be, for example, 32 bytes per one bus clock where the FSB 330 is compatible with the Pentium 4 processor front-side bus and thus, is quad pumped.

As illustrated, the controller 512 is to cause assertion of the DPWR# signal 350 in bus clock period T10, which is sampled by the CPU 300 in bus clock period T11, such that, due to propagation delay, the data input sense amplifiers 320 are enabled in bus clock period T12. Due to the unbalanced transfer rate, there is a gap in data transfer in T13. In other words, the response agent does not have the next 32 bytes ready for transfer until bus clock T14. Accordingly, DRDY# signal 440 is deasserted during clock period T13 and reasserted during clock period T14 when the next 32 bytes are ready for transfer. As shown, the DBSY# signal 430 is asserted in T12 and T13 indicating that the FSB 330 data bus is occupied by the response agent in T14. Accordingly, the controller 512 is to cause assertion of the DPWR# signal 350 in T10 and cause deassertion of the signal in T15 aligned with the last DRDY# signal 440.

Figure 5E:
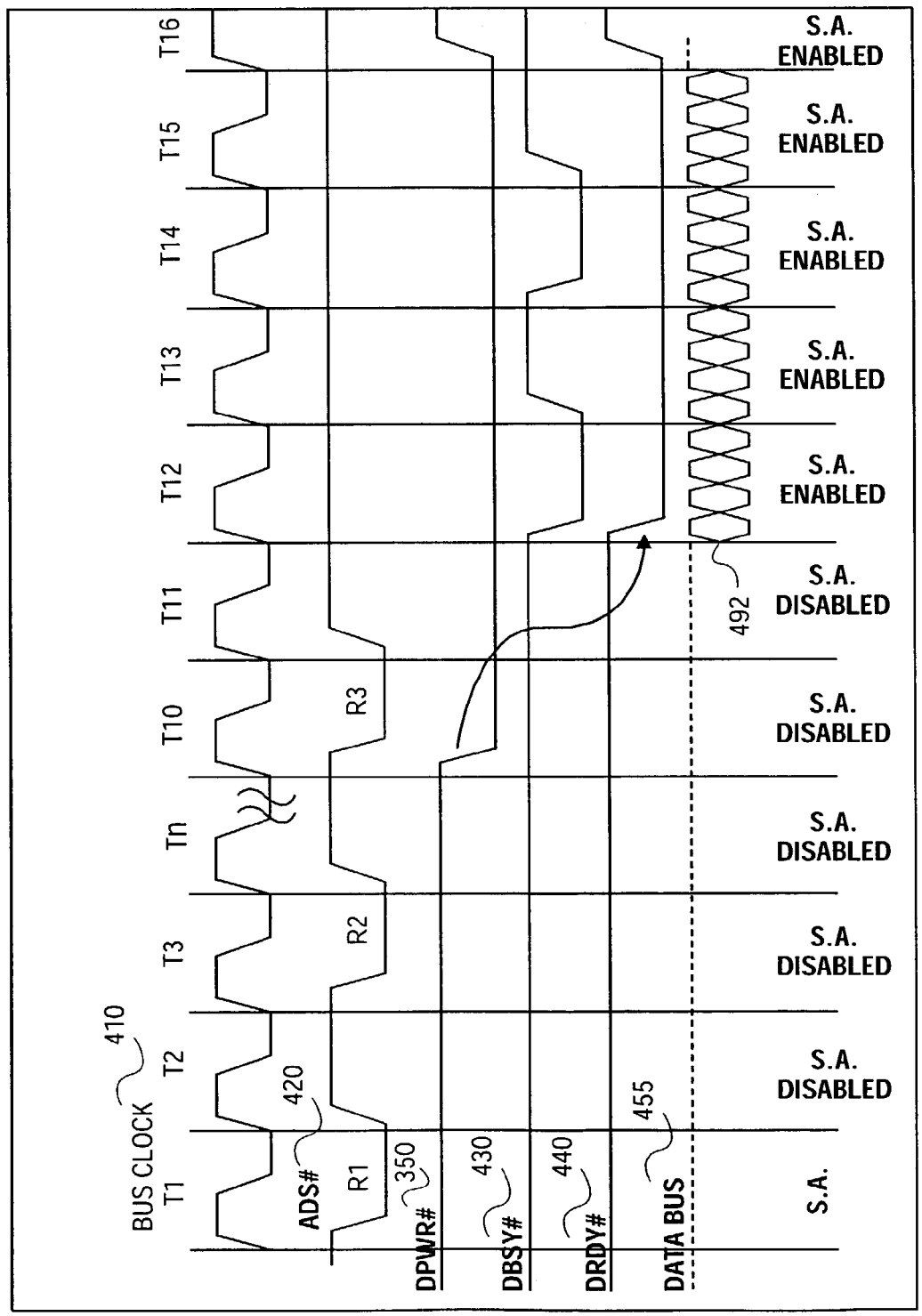

FIG. 5E is a timing diagram illustrating a pipelined bus for an example in which read data returns are issued back-to-back with no idle clocks in between, in accordance with one embodiment For the example illustrated, the system 500 provides for a dual-channel DDR memory configuration, but other memory approaches may be used for other embodiments. As illustrated, the controller 512 is to cause assertion of the DPWR# signal 350 in bus clock period T10, two clock periods before the data phase transfer stream. In the example illustrated, three read transactions (R1, R2 and R3) are requested.

Data transfer associated with transaction R1 starts in bus clock period T12 and ends in bus clock T13. Data transfer for transaction R2 starts in bus clock T14 and ends in bus clock T15. In the embodiment depicted, the controller 512 does not cause deassertion of the DPWR# signal 350 between the back-to-back data transfers, in order to allow the sense amplifiers to remain open for the entire data stream. The controller 512 is to cause deassertion of the DPWR# signal 350 in bus clock T16 aligned with the last DRDY# signal 440 of transaction R3. For the embodiment illustrated, a wait state is inserted at bus clock period T16 and the DPWR# signal 350 is not sampled by the CPU 300 until bus clock period T17 (not shown) in order to enable capture of source synchronous receive data. For other embodiments, a different number of wait states may be inserted between deassertion of the data ready signal and deassertion of the data bus power control signal.

Figure 5F:
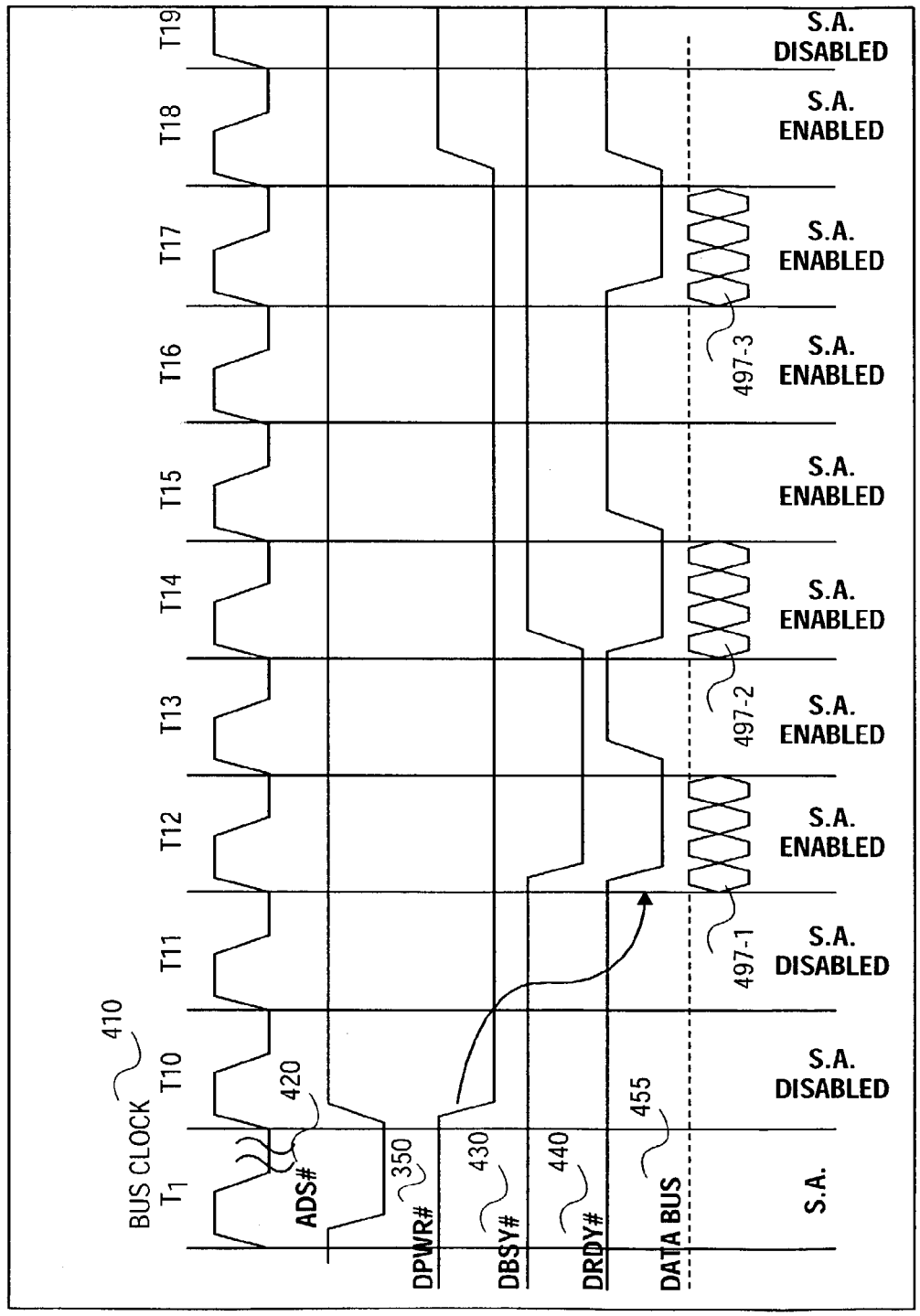

FIG. 5F is a timing diagram illustrating a pipelined read from a single channel DDR memory, in accordance with one embodiment. As illustrated in FIG. 5F, two read transactions (R1 and R2) are issued separated by three clock periods. Transaction R1 is issued in bus clock period T1 while transaction R2 is issued in bus clock period T4 (not shown in FIG. 5F). Associated data is returned beginning in bus clock period T12. In this particular example, due to the fact that the request agent has requested read data from a one channel DDR memory, the response agent is required to assert a wait state. Accordingly, the controller 512 is to cause deassertion of the DPWR# signal 350 in bus clock T18 aligned with the deassertion of the last DRDY# signal 440 of transaction R2. As illustrated, the controller 512 does not cause deassertion of the DPWR# signal in bus clock T15 in order to provide the predetermined clock gap (two clock periods in this example) between assertion of DPWR# signal 350 until issuance of the first DRDY# signal 440.

Additional alternative embodiments include the case of a chipset having an on-chip write back buffer, wherein the controller 512 is to cause assertion of the DPWR# signal together with a snoop phase approximately three clocks from assertion of an address strobe (e.g., ADS# signal). In one embodiment, this allows data transfer at the time allotted by a bus protocol. In one embodiment, the time allowed by such a bus protocol is five clocks from assertion of the address strobe ADS# signal, which provides two clock periods for snoop results.

Furthermore, within computer system 500, as depicted in FIG. 4, in one embodiment each bus agent maintains a record of all transactions currently in process, what phase each transaction is currently in, and what responsibilities (if any) the respective agent has during each phase. As such, in order to properly interact with the bus (FSB 330) at each stage of the appropriate transaction, each agent maintains an I/O transaction queue or in-order queue (IOQ). Accordingly, once a transaction is guaranteed a response, indicating that the transaction will now be completed, the request agent deletes the transaction from the IOQ. As such, in an alternative embodiment, the DPWR# signal could remain asserted until an IOQ of the requesting agent is empty.

While several specific examples of data bus power control relative timings have been described above using a particular bus protocol and particular signals, it will be appreciated that the data bus power control approaches of alternative embodiments may be implemented with different bus protocols and signals. Further, while the data bus power control signal has been primarily described in reference to CPU read transactions, it will be appreciated that the data bus power control approach of various embodiments is equally applicable to other transactions that causes data to be delivered to a requesting agent. For example, for some systems advanced programmable interrupt controller (APIC—not shown) transactions may be defined as "write" transactions, but return data to the CPU and thus, the data bus power control approach of one embodiment may be applied to reduce power consumption.

Figure 6:
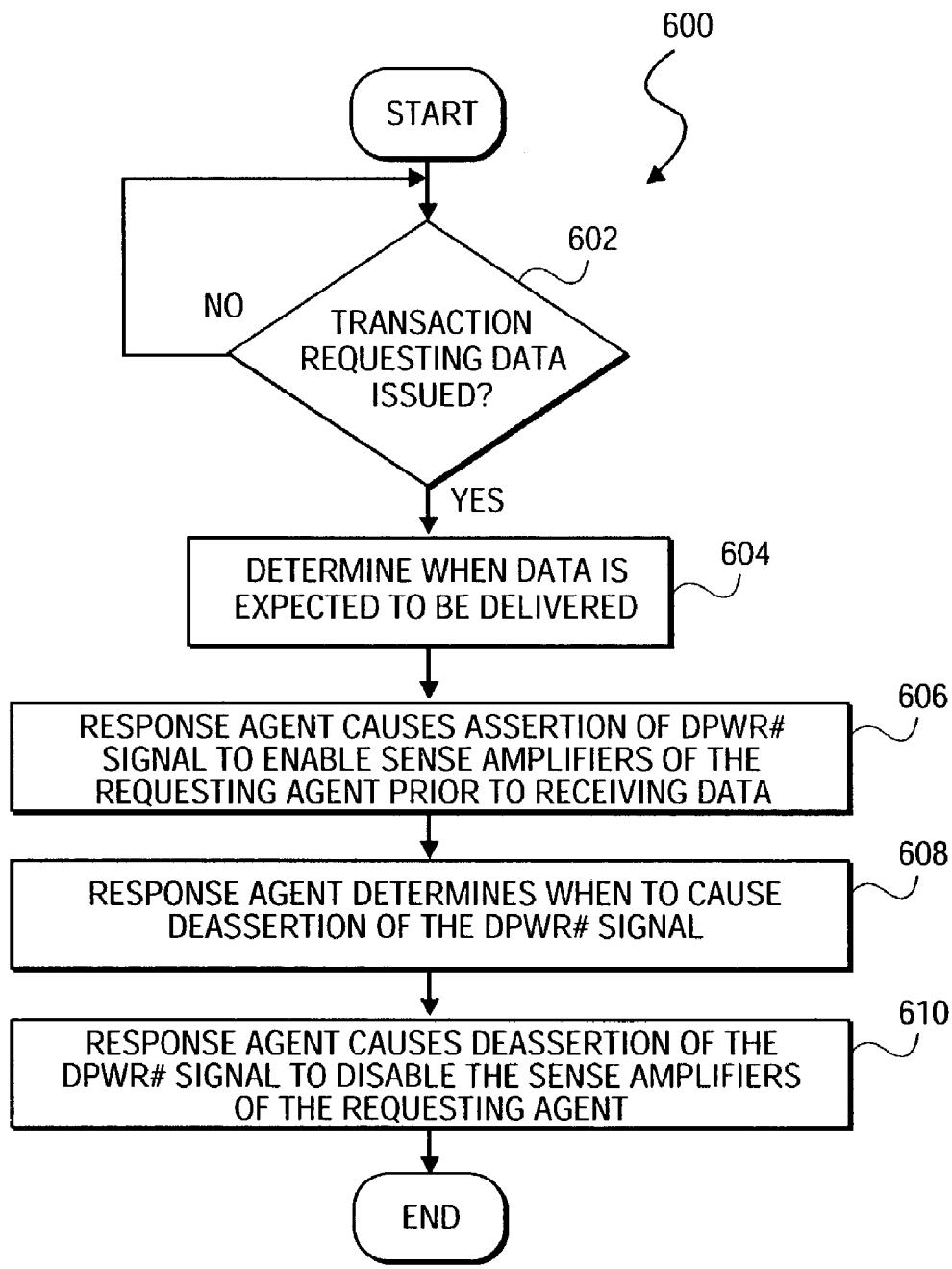
FIG. 6 is a flow chart illustrating a method in accordance with one embodiment.

A method for data bus power control is described in the flow chart 600 illustrated in FIG. 6. At process block 602, a response agent detects a transaction where data is to be returned to the requesting agent (such as a read transaction). At process block 604, the response agent determines when the data is expected to be delivered. At process block 606, the response agent causes assertion of the DPWR # signal to enable the sense amplifiers of the requesting agent to receive the data.

At process block 608 the response agent determines when to cause the deassertion of the DPWR# signal, based on the completion of the data transfer to the requesting agent. At process block 610, the response agent causes the deassertion of the DPWR# signal which causes the data input sense amplifiers to be disabled.

In one embodiment, the DPWR# signal is caused to be deasserted once the data phase of a read transaction is complete. In general, completion of the data phase of a read transaction occurs once the DRDY# signal is deasserted. However, in one embodiment, disabling of the data input sense amplifiers is delayed for one or more clock period waiting periods following deassertion of the DRDY# signal, which may be used to enable propagation of source synchronous receive data over the bus, which is provided following deassertion of a DRDY# signal.

Figure 7:
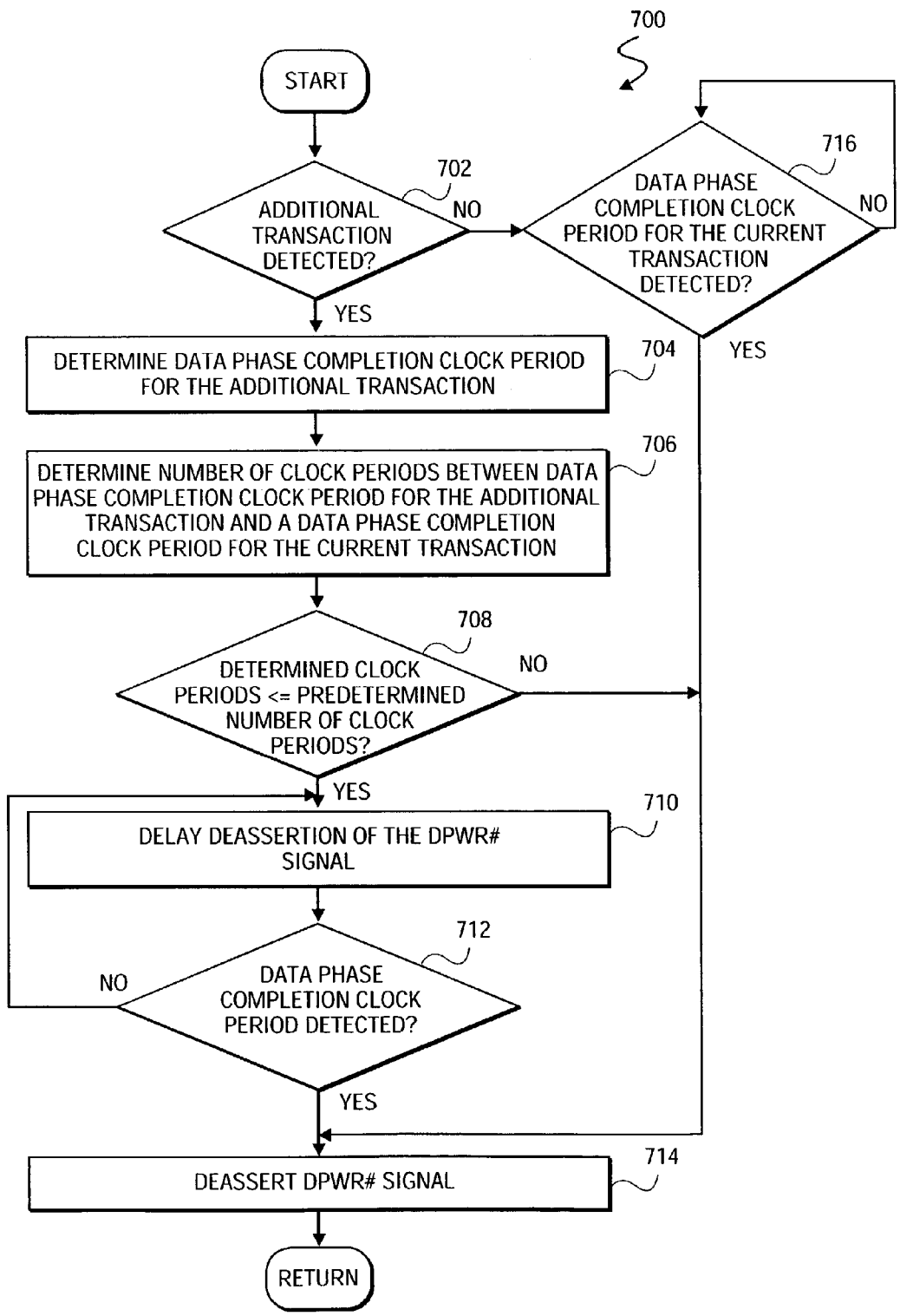
FIG. 7 is a flow chart illustrating a method in accordance with one embodiment.

FIG. 7 depicts a flow chart illustrating an additional technique for causing the deassertion of the power control signal DPWR#, in accordance with one embodiment. At process block 700 the response agent determines whether an additional future transaction (which will result in data being returned to the requesting agent). If such an additional transaction is not detected, at process block 716 the response agent determines whether a clock period for data phase completion for the current transaction is detected. Once detected, at process block 714 the power control signal DWPR# is caused to be deasserted.

Conversely, if an additional transaction (which would return data to the requesting agent) is detected, in processing block 704 a data phase completion clock period is determined for the additional transaction. Once the data phase completion clock period is detected, at process block 706 a number of clock periods between the data completion clock period for the additional transaction and a data phase completion clock period for a current transaction is determined. At process block 708 it is determined whether the determined number of clock periods is less than or equal to a predetermined number of clock periods. When the determined clock periods of process block 706 are less than the predetermined number of clock periods, at process block 710 deassertion of DPWR# signal is delayed, to allow the sense amplifiers of the requesting agent to remain enabled to receive the future data of the additional transaction.

Accordingly, at process block 712 deassertion of the DPWR# signal continues to be delayed until a data phase completion clock period for additional transaction is detected. Once detected, at process block 714 the DPWR# signal is caused to be deasserted.

Figure 8:
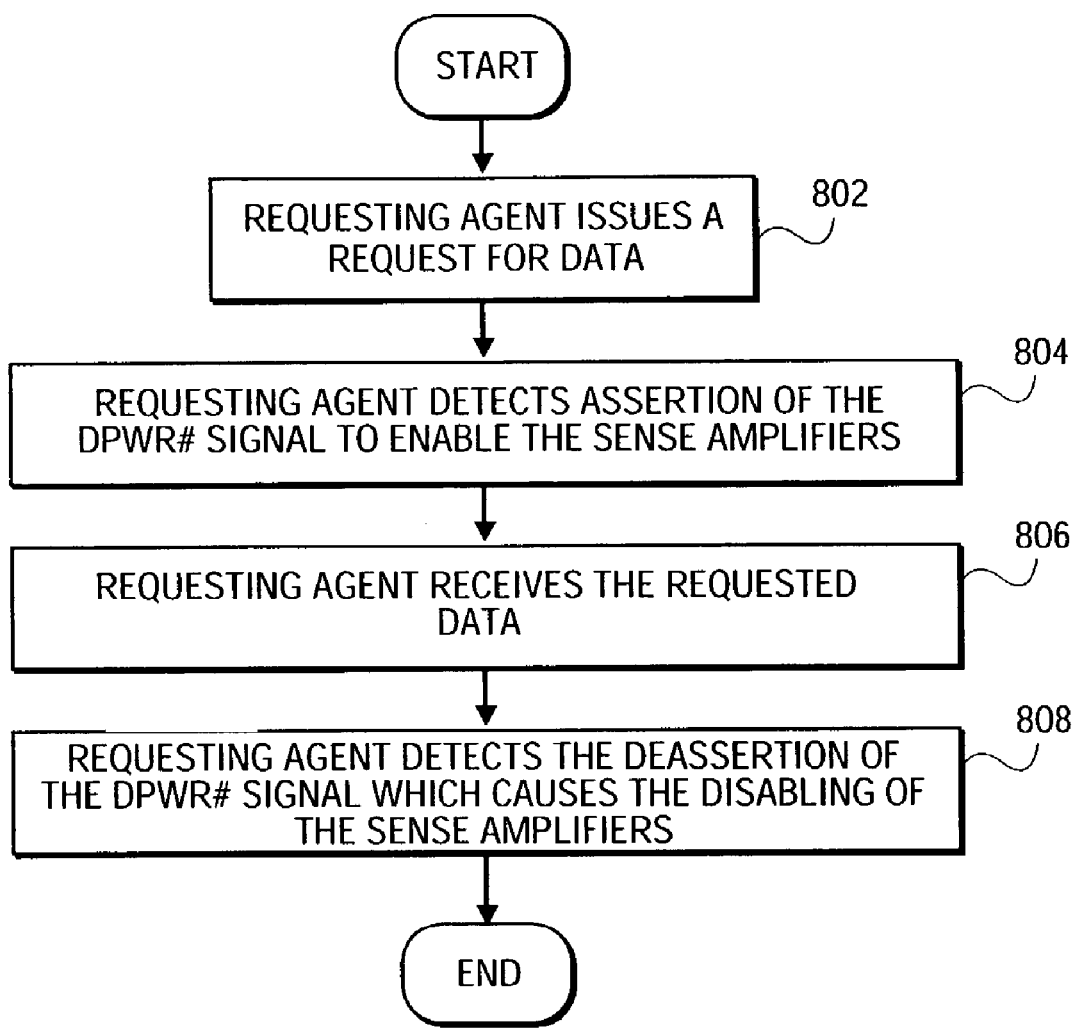
FIG. 8 is a flow chart illustrating a method in accordance with one embodiment.

A method for data bus power control is described in the flow chart 800 illustrated in FIG. 8. In process block 802, the requesting agent (e.g., a CPU) issues a request transaction that would result in data being returned to the requesting agent (such as a read transaction). In process block 804, prior to receiving the data, the requesting agent detects assertion of the DPWR# signal, which causes the data input sense amplifiers of the requesting agent to be enabled to receive the requested data. In process block 806, the requesting agent receives the requested data. In process block 808, the requesting agent detects the deassertion of the DPWR# signal, which causes the disabling of the data input sense amplifiers of the requesting agent to reduce power consumption.

Figure 9:
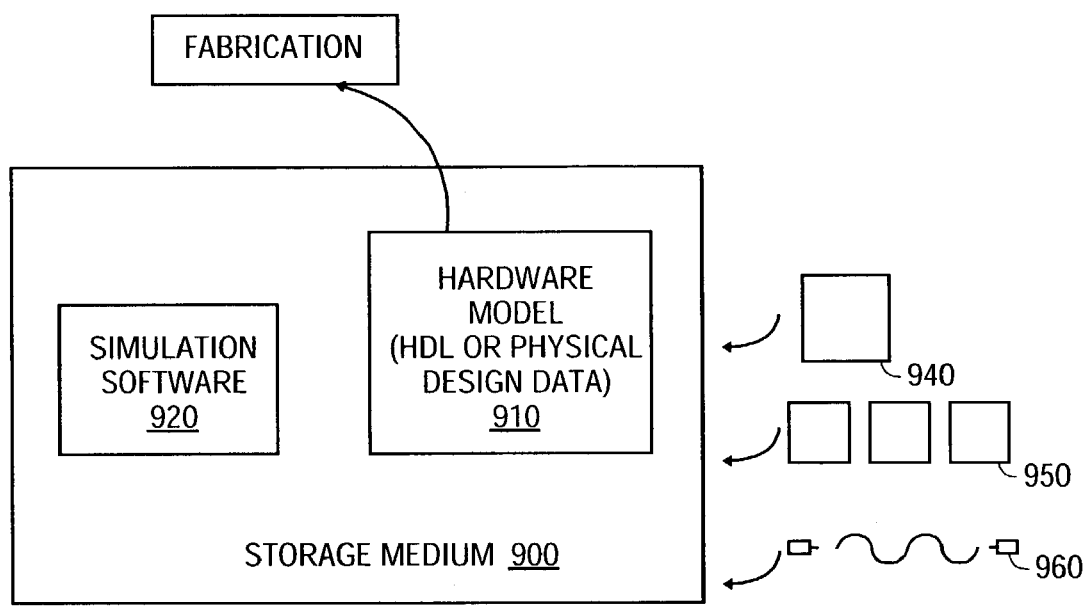
FIG. 9 is a block diagram illustrating various design representations or formats for simulation, emulation and fabrication of a design using the disclosed techniques.

FIG. 9 is a block diagram illustrating various design representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 910 may be stored in a storage medium 900, such as a computer memory, so that the model may be simulated using simulation software 920 that applies a particular test suite 930 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 960 modulated or otherwise generated to transport such information, a memory 950 or a magnetic or optical storage 940, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments It will be appreciated that, for other embodiments, a different system configuration may be used. For example, while the system 500 includes a single CPU 300, for other embodiments, a multiprocessor system (where one or more processors may be similar in configuration and operation to the CPU 300 described above) may benefit from the data bus power control approach of various embodiments. Further different type of system or different type of computer system such as, for example, a server, a workstation, a desktop computer system, a gaming system, an embedded computer system, a blade server, etc., may be used for other embodiments.

Having disclosed exemplary embodiments, modifications and variations may be made to the disclosed embodiments while remaining within the scope of the embodiments of the invention as defined by the following claims.

What is claimed is:

1. A bus agent comprising:
   a controller coupled to an external bus, the controller to read a transaction request for data issued from a separate bus agent coupled to the external bus, the controller to cause assertion of a data bus power control signal a predetermined number of clock periods prior to a data delivery period associated with the transaction request, the data bus power control signal to enable a set of input data sense amplifiers of the separate bus agent, prior to the separate bus agent receiving the data.

2. The bus agent of claim 1, wherein the controller is to cause deassertion of the data bus power control signal to disable the set of input data sense amplifiers, the controller to cause the deassertion based on a completion of a data transfer.

3. The bus agent of claim 1, wherein the controller is to cause deassertion of the data bus power control signal to disable the set of input data sense amplifiers, the controller to cause the deassertion based a completion of a data transfer and if no data is scheduled to be sent to the requesting agent within a predetermined clock period.

4. The bus agent of claim 1, wherein the bus agent is a chipset.

5. The bus agent of claim 1, wherein the bus agent is a memory controller.

6. The bus agent of claim 1, wherein the separate bus agent is a processor.

7. The bus agent of claim 1, wherein the controller is to determine the data delivery period associated with the request, the controller is to cause assertion of the data bus power control signal at least two clock periods prior to the data delivery period.

8. A bus agent comprising:
   an interface to a bus, the interface to cause assertion of a data bus power control signal a predetermined number of clock periods prior to a data delivery period associated with a transaction request issued by a separate bus agent on the bus requesting data, the data bus power control signal to allow a set of input data sense amplifiers of the separate bus agent to receive the data.

9. The bus agent of claim 8, wherein the interface is to cause deassertion of the data bus power control signal to disable the set of input data sense amplifiers, the interface to cause the deassertion based on a completion of a data transfer.

10. The bus agent of claim 8, wherein the interface is to cause deassertion of the data bus power control signal to disable the set of input data sense amplifiers, the interface to cause the deassertion based on a completion of a data transfer and if no data is scheduled to be sent to the requesting agent within a predetermined clock period.

11. The bus agent of claim 8, wherein the bus agent is to determine the data delivery period associated with the request, and the bus agent is to cause assertion of the data bus power control signal at least two clock periods prior to the data delivery period.

12. The bus agent of claim 11, wherein the predetermined number of clock periods is 2 clock periods.

13. The bus agent of claim 8, wherein the bus agent is a chipset.

14. The bus agent of claim 8, wherein the bus agent is a memory controller.

15. The bus agent of claim 8, wherein the separate bus agent is a processor.

16. A bus agent comprising:
   an input buffer having a set of input data sense amplifiers; and
   the sense amplifiers are coupled to a data bus power control signal, the sense amplifiers are caused to be enabled to receive data from a separate bus agent coupled to an external bus in response to assertion of the data bus power control signal, prior to the bus agent receiving the data, wherein the data bus power control signal is caused to be asserted and caused to be deasserted by the separate bus agent coupled to the external bus.

17. The bus agent of claim 16, wherein the input data sense amplifiers are caused to be disabled in response to deassertion of the data bus power control signal, after the bus agent has received the data.

18. The bus agent of claim 16, wherein the bus agent is to cause issuance of a request for data.

19. The bus agent of claim 16, wherein the bus agent is a processor.

20. The bus agent of claim 16, wherein the separate bus agent is a chipset.

21. The bus agent of claim 16, wherein the separate bus agent is a memory controller.

22. The bus agent of claim 16, wherein the sense amplifiers are caused to be enabled to receive data from the external bus in response to assertion of the data bus power control signal at least two clock periods prior to the bus agent receiving requested data.

23. The bus agent of claim 16, wherein the sense amplifiers are caused to be disabled in response to deassertion of the data bus power control signal after the bus agent has received the data and if no data is scheduled to be sent to the bus agent within a predetermined clock period.

24. A method comprising:
   reading, by a bus agent on a bus, a transaction request for data issued from a separate bus agent on the bus;
   determining a data delivery period associated with the transaction request; and
   asserting a data bus power control signal a predetermined number of clock periods prior to the data delivery period to enable a set of input data sense amplifiers of the separate bus agent prior to the separate bus agent receiving the data.

25. The method of claim 24, deasserting the data bus power control signal to disable the set of input data sense amplifiers, after completion of a data transfer.

26. The method of claim 24, deasserting the data bus power control signal to disable the set of input data sense amplifiers, after completion of a data transfer and if no data is scheduled to be sent to the requesting agent within a predetermined clock period.

27. The method of claim 24, wherein the asserting the data bus power control signal includes asserting the data bus power control signal a predetermined number of clock periods prior to the data delivery period.

28. The method of claim 24, further including asserting the data bus power control signal at least two clock periods prior to the data delivery period.

29. The method of claim 24, wherein the method is performed by a chipset.

30. The method of claim 24, wherein the method is performed by a memory controller.

31. The method of claim 24, wherein the separate bus agent is a processor.

32. A method comprising:
   issuing, by a bus agent on an external bus, a request for data; and
   in response to detecting assertion of a data bus power control signal from a separate bus agent on the external bus, enabling a set of input sense amplifiers to receive the data from the separate bus agent over the external bus, prior to receiving requested data.

33. The method of claim 32, further including, in response to detecting deassertion of the data bus power control signal, disabling the input sense amplifiers.

34. The method of claim 32, further including, in response to detecting deassertion of the data bus power control signal, disabling the input sense amplifiers, after the data has been received and if no data is scheduled to be received within a predetermined clock period.

35. The method of claim 32, further including enabling the sense amplifiers to receive data from an external bus in response to detecting assertion of the data bus power control signal a predetermined number of clock periods prior to receiving requested data.

36. The method of claim 32, further including enabling the sense amplifiers to receive data from an external bus in response to detecting assertion of the data bus power control signal at least two clock periods prior to receiving requested data.

37. The method of claim 32, wherein the method is performed by a processor.

38. The method of claim 32, wherein the detecting assertion of the data bus power control signal includes detecting assertion of the data bus power control signal that was caused to be asserted by a chipset.

39. The method of claim 32, wherein the detecting assertion of the data bus power control signal includes detecting assertion of the data bus power control signal that was caused to be asserted by a memory controller.

40. An article comprising a machine readable carrier medium carrying data which, when loaded into a computer system memory in conjunction with simulation routines, provides functionality of a model comprising:
   a controller coupled to an external bus, the controller to read a transaction request for data issued from a separate bus agent coupled to the external bus, the controller to cause assertion of a data bus power control signal a predetermined number of clock periods prior to a data delivery period associated with the transaction request, the data bus power control signal to enable a set of input data sense amplifiers of the separate agent, prior to the separate bus agent receiving the data.

41. The article of claim 40, wherein the controller is to cause deassertion of the data bus power control signal to disable the set of input data sense amplifiers, the controller to cause the deassertion based on a completion of a data transfer.

42. The article of claim 40, wherein the controller is to cause deassertion of the data bus power control signal to disable the set of input data sense amplifiers, the controller to cause the deassertion based on a completion of a data transfer and if no data is scheduled to be sent to the separate bus agent within a predetermined clock period.

43. The article of claim 40, wherein the controller is to determine the data delivery period associated with the request, the controller is to cause assertion of the data bus power control signal at least two clock periods prior to the data delivery period.

44. An article comprising a machine readable carrier medium carrying data which, when loaded into a computer system memory in conjunction with simulation routines, provides functionality of a model comprising:
   an input buffer having a set of input data sense amplifiers; and
   the sense amplifiers are coupled to a data bus power control signal, the sense amplifiers are caused to be enabled to receive data from a separate bus agent coupled to an external bus in response to assertion of the data bus power control signal, prior to receiving requested data, wherein the data bus power control signal is caused to be asserted and caused to be deasserted by the separate bus agent coupled to the external bus.

45. The article of claim 44, wherein the input data sense amplifiers are caused to be disabled in response to deassertion of the data bus power control signal.

46. The article of claim 44, wherein the data bus power control signal is caused to be asserted and caused to be deasserted by a separate bus agent coupled to the external bus.

47. The article of claim 44, wherein the sense amplifiers are caused to be enabled to receive data from an external bus in response to assertion of the data bus power control signal at least two clock periods prior to the bus agent receiving requested data.

48. The article of claim 44, wherein the sense amplifiers are caused to be disabled in response to deassertion of the data bus power control signal after the bus agent has received the data and if no data is scheduled to be sent to the bus agent within a predetermined clock period.

49. A system comprising:
   an external bus;
   a chipset coupled to the external bus, comprising:
   a controller coupled to a bus interface, the controller to read a transaction request for data issued from a processor, the controller to cause assertion of a data bus power control signal a predetermined number of clock periods prior to a data delivery period associated with the transaction request prior to the processor receiving the data; and
   the processor coupled to the external bus, comprising:
   an input buffer having a set of input data sense amplifiers; and
   the sense amplifiers are coupled to the data bus power control signal, the sense amplifiers are caused to be enabled to receive data from the external bus in response to assertion of the data bus power control signal, prior to the processor receiving data.

50. The system of claim 49, wherein the controller of the chipset is to cause deassertion of the data bus power control signal to disable the set of input data sense amplifiers, the controller to cause the deassertion based on a completion of a data transfer.

51. The system of claim 49, wherein the controller of the chipset is to cause deassertion of the data bus power control signal to disable the set of input data sense amplifiers, the controller to cause the deassertion based on a completion of a data transfer and if no data is scheduled to be sent to the requesting agent within a predetermined clock period.

52. The system of claim 49, wherein the controller of the chipset is to determine the data delivery period associated with the request, the controller is to cause assertion of the data bus power control signal at least two clock periods prior to the data delivery period.

53. The system of claim 49, wherein the input data sense amplifiers of the processor are caused to be disabled in response to deassertion of the data bus power control signal.

54. The system of claim 49, wherein the input data sense amplifiers of the processor are caused to be disabled in response to deassertion of the data bus power control signal after the bus agent has received the data and if no data is scheduled to be sent to the bus agent within a predetermined clock period.

55. The system of claim 49, wherein the input data sense amplifiers of the processor are caused to be enabled to receive data from an external bus in response to assertion of the data bus power control signal at least two clock periods prior to the bus agent receiving requested data.

* * * * *

UNITED STATES PATENT AND TRADEMARK OFFICE
CERTIFICATE OF CORRECTION

PATENT NO.       : 7,152,167 B2                                    Page 1 of 1
APPLICATION NO.  : 10/317776
DATED            : December 19, 2006
INVENTOR(S)      : Kurts et al.

It is certified that error appears in the above-identified patent and that said Letters Patent is hereby corrected as shown below:

In column 12, at line 27, delete "," and insert --a predetermined number of clock periods--.

In column 13, at line 23, after "signal" insert --a predetermined number of clock periods prior to a data delivery period associated with the request for data--.

In column 13, at line 55, delete "carrier".

In column 14, at line 17, delete "carrier".

In column 14, at line 27, delete "," and insert --a predetermined number of clock periods--.

Signed and Sealed this

Twenty-seventh Day of November, 2007

JON W. DUDAS
*Director of the United States Patent and Trademark Office*